United States Patent [19]

Johansson

[11] Patent Number: 4,530,825
[45] Date of Patent: Jul. 23, 1985

[54] PROCESS FOR THE PRODUCTION OF SILICON NITRIDE

[75] Inventor: Thomas Johansson, Ljungaverk, Sweden

[73] Assignee: KemaNord AB, Stockholm, Sweden

[21] Appl. No.: 599,702

[22] Filed: Apr. 12, 1984

[30] Foreign Application Priority Data

Apr. 19, 1983 [SE] Sweden ................................ 8302207

[51] Int. Cl.³ .......................................... C01B 21/068
[52] U.S. Cl. ....................................... 423/344; 501/97
[58] Field of Search ............... 156/DIG. 99; 423/344, 423/DIG. 11; 501/97

[56] References Cited

U.S. PATENT DOCUMENTS 1,054,901  3/1913  Bosch et al. ........................ 423/344
3,855,395  12/1974  Cutler .................................... 423/344
4,117,095  9/1978  Komeya et al. .................... 423/344

FOREIGN PATENT DOCUMENTS 0079678  5/1983  European Pat. Off. .............. 501/97

OTHER PUBLICATIONS

CRC Handbook of Chemistry and Physics, 62nd ed., Weast, ed., 1981-1982, pp. F282, B-27.

Primary Examiner—H. T. Carter
Assistant Examiner—Robert Alway
Attorney, Agent, or Firm—Fred Philpitt

[57] ABSTRACT

A process for the production of silicon nitride by reaction of silicon dioxide, carbon and nitrogen at temperatures above about 1300° C. whereby a partial pressure of nitrogen above 1 bar is maintained during the reaction.

11 Claims, 1 Drawing Figure

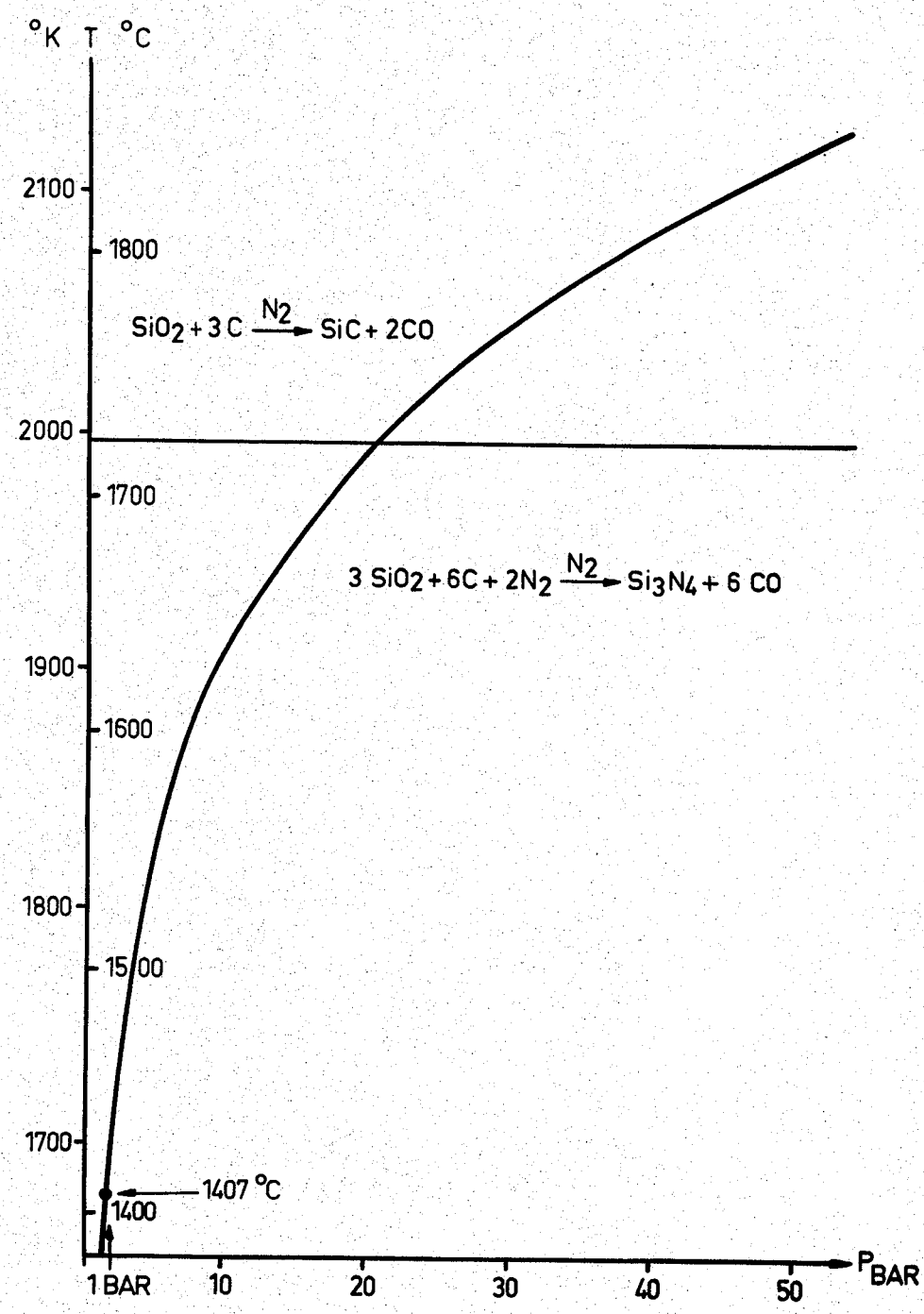

PROCESS FOR THE PRODUCTION OF SILICON NITRIDE

TECHNICAL FIELD

The present invention relates to a process for the production of silicon nitride by reacting silicon dioxide, carbon and nitrogen at an elevated temperature.

BACKGROUND OF THE INVENTION

Silicon nitride can be produced according to several different techniques. One common method involves direct production from the elements silicon and nitrogen gas at temperatures between about 1150° and 1300° C. However, this process is strongly exothermic and the temperature must be carefully controlled and observed if a sufficiently high part of the alpha-phase, which is desired for the production of sintered products, shall be obtained. Local overheating occurs easily and leads to an increased formation of beta-phase which is not desirable. The starting materials are fairly expensive and there are high requirements on their purity and on an adjusted particle size.

For the production of silicon nitride from silicon dioxide, carbon and nitrogen, heat is supplied and the reaction is endothermic. The production method is considerably more simple and less sensitive than production from elementary silicon. The costs for the raw materials are also lower. However, the process results in a product having a higher content of impurities, for example of oxides and carbide, and particularly so at high temperatures and a high production rate.

Attempts have been made to solve the problems connected with the method based on silicon dioxide by using a considerable excess of carbon, which makes the formation of higher fractions of alpha-phase possible. However, problems will arise when the carbon excess has to be removed after the reaction. The common method of burning off the carbon excess results in a product having high contents of oxides. Other additions for influencing the process have also been suggested. However, these generally tend to add undesirable substances to the products and to increase the costs, among other things due to the fact that the additions must fulfill high demands on purity.

THE INVENTION GENERALLY

The main objects of the present invention are to avoid the above mentioned problems at the production of silicon nitride from silicon dioxide, carbon and nitrogen and to make it possible to have a high production rate and a high purity and high alpha-phase content of the product.

These objects are achieved in the manner set forth below.

Several advantages are gained by using an overpressure of nitrogen gas at the reaction as according to the invention. The limit temperature at which silicon carbide is formed instead of silicon nitride is increased with an increasing nitrogen gas pressure and this reduces the formation of carbide and makes it possible to use higher reaction temperatures. The reaction rate for the nitrogen reactions which are the rate determining reactions is also increased. This results in an increased tranformation rate and thus an increased production. The higher gas density gives an improved heat transfer which increases the transformation rate further. Carbon monoxide formed at the reaction has a less negative influence on the reaction rate at a higher nitrogen pressure. These improved reaction conditions do not only result in an increased production but also in an increased transformation degree in such a manner that the oxide content of the product is reduced. Further, a reduced excess of carbon can be utilized. The reaction to the silicon nitride will take place via intermediates favouring the formation of alpha-phase. The silicon dioxide which is normally hard to react can be transformed faster so that it is not necessary to use amorphous silicon dioxide. It is possible to run the reaction as a two-step process wherein the first step is a reduction of part of the silicon dioxide to carbide by means of the carbon and wherein nitrogen is supplied in the second step for formation of the nitride. In this process most of the carbon monoxide is formed in the first step and the nitrogen gas will thus be less diluted with carbon monoxide in the second step, and this advantage is better utilized at higher nitrogen pressures.

Further objects and advantages of the invention will be evident from the detailed description below.

DETAILED DESCRIPTION OF THE INVENTION

The silicon raw material in the process can be any silicon dioxide. Crystalline silicon dioxides such as quartz can be used, and also amorphous silicon dioxides. An economical source of silicon dioxide is rice husks, preferably coked before use as raw material in the process. The degree of purity is selected with respect to the intended field of utilization for the final product, generally a purity above 95 percent, and preferably above 99 percent, is desired. The same demands on purity should be set on the carbon raw material. The mole ratio between added amount of carbon and added amount of silicon dioxide should be between 1.9 and 10, preferably between 1.95 and 3, and most preferably between 1.95 and 2.2.

The powder bed can optionally also contain other components, for example elementary silicon to increase the silicon monoxide content during the reaction or to replace part of the amount of carbon. Powder of alpha-phase silicon nitride in an amount of 5 to 50 percent of the bed weight can also be added, as conventionally, to maintain a satisfactory bed porosity during the reaction.

The particle sizes of the powder form components in the bed should be kept below about 30 $\mu$m and preferably between 0.1 and 10 $\mu$m.

The nitrogen can be supplied in the form of ammonia or as a mixture of nitrogen gas and inert gas such as hydrogen or argon, but pure nitrogen gas is preferably used. The gas is suitably supplied to the powder mixture continuously by flushing the reactor. The nitrogen gas can be supplied from the beginning of the reaction, but, as indicated above, it is also possible to add the gas first when part of the silicon dioxide has reacted to carbide with a stoichiometric amount of carbon (3 moles of carbon for each mole of reacted silicon dioxide) whereby nitriding of formed carbide and the rest of the silicon dioxide takes place. The partial pressure of the nitrogen gas should, as mentioned, be kept above atmospheric pressure. In order to gain considerable advantages in the described respects the partial pressure should, however, be kept above 5 bars. It is particularly advantageous to maintain a partial pressure above 20 bars since each increase of pressure up to this point makes it possible to increase the reaction temperature while maintaining the silicon dioxide in solid form and without going beyond the limiting curve for formation of silicon carbide. Advantages relative to heat transfer and reaction rate can be gained also above 20 bars without temperature increase, but for practical reasons the pressure should be kept below 200 bars, and preferably also below 50 bars. A pressure between 10 and 30 bars is particularly suitable, with regard to demands on both temperature and pressure.

During the reaction carbon monoxide is produced, which reduces the reaction speed if it is allowed to accumulate in the reactor and dilute the nitrogen atmosphere. The problem can be avoided by continuously feeding fresh nitrogen containing gas to the reactor. Preferably the carbon monoxide is removed from the reaction gas which can then be recycled to the reactor.

Several methods are available for removing the carbon monoxide. The gas can be brought in contact with metal powders at relatively low temperatures whereby the corresponding metal carbonyl compounds are formed. These are normally liquid and can be separated easily and be decomposed by heating. Iron, cobolt and nickel are examples of suitable metals for this purpose. Alternatively the carbon monoxide content of the gas can be removed by oxidizing it into carbon dioxide by adding oxygen. The carbon dioxide can then be removed from the gas as carbonate by contacting it with hydroxides or metal oxides, by physical adsorption on for example zeolites or by condensation at low temperatures. It is preferred to use air when adding oxygen for the purpose of burning the carbon monoxide since the nitrogen content of the air can then be used as nitrogen source for the process when recycling the gas after carbon dioxide removal. The nitrogen will then be obtained to the only cost of compressing the air to the superatmospheric pressure used in the process and a balanced process requiring only a small bleed of nitrogen will result. Optionally the heat generated in burning the monoxide can be used. Generally, when returning the nitrogen containing gas to the reactor, it is suitable to remove remaining traces of carbon dioxide to avoid its corrosive effects in the reactor and an unforeseeable consumption of reactant carbon. Most easily the carbon dioxide is converted into carbon monoxide by contacting it with carbon at an elevated temperature, for example in a carbon rich zone in the reactor separate from the reaction mixture itself.

The possible reaction temperature has earlier been limited by the threshold temperature for formation of silicon carbide, which is about 1400° C. at 1 bar. By increasing the partial pressure of the nitrogen, according to what has been said above, the threshold temperature is increased and thus also the possible reaction temperature. The reaction temperature is suitably set above 90% of the threshold temperature, in degrees Celsius, at the selected nitrogen pressure, preferably also above 95% of this threshold temperature and most preferably as close to the threshold temperature as possible. However, the fusion temperature for the silicon dioxide should not be exceeded, for quartz this is about 1720° C. and corresponding to the threshold temperature at a nitrogen pressure of about 20 bars. For this reason suitable temperature values are between 1600° and 1700° C. and particularly between 1650° and 1700° C. For the production of silicon nitride with extremely high alpha-phase contents and low carbide contents lower temperature can be used, for example below 1400° C. and even below 1300° C. The temperatures are given for the temperature in the powder bed, if any temperature gradients should occur in the reactor.

For the reaction a reactor for positive pressure with means for observation of temperature and pressure is used and which reactor has means for supplying heat, for example means for external heating, induction heating, electric arc or means for combustion.

The obtained product can be post-treated to remove excess carbon, oxides or other impurities. The demands on purity are set with consideration of the intended field of utilization. For sintered products it is desired to have a content of alpha-phase above 90 percent by weight, and preferably above 95 percent, and a content of impurities below 5 percent and preferably below 2 percent by weight. The described process can be run to meet these demands without subsequent purification of the product.

DESCRIPTION OF THE DRAWING

The drawing shows a relationship between the threshold temperature for formation of silicon carbide as a function of the nitrogen pressure. The threshold temperature, in degrees Kelvin and degrees Celsius, is marked on the vertical axis and the pressure, in bar, on the horizontal axis. It is evident that the threshold temperature increases rapidly with the pressure and that the increase is very rapid up to about 10 bars. The threshold temperature at 1 bar is about 1407° C. A horizontal line is shown in the drawing at 1720° C. and this refers to the fusion temperature of quartz.

At pressure/temperature combinations above the limiting curve silicon carbide is formed according to the following relationship:

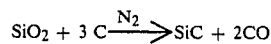

$$SiO_2 + 3C \xrightarrow{N_2} SiC + 2CO$$

At pressure/temperature combinations below the limiting curve silicon nitride is obtained according to the relationship:

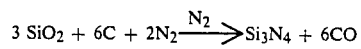

$$3SiO_2 + 6C + 2N_2 \xrightarrow{N_2} Si_3N_4 + 6CO$$

At the process according to the invention pressure and temperature conditions should thus be selected within the area below the limiting temperature curve. However, temperatures above the line for the fusion temperature of silicon dioxide should be avoided. Preferably temperatures above the threshold temperature at 1 bar are selected.

EXAMPLE

Amorphous silica and carbon powder were mixed in the stoichiometric mole ratio of 1:2. The mixture was heated in an autoclave to a temperature of 1600° C. in a pure nitrogen atmosphere of 100 bar pressure. After 2 hours the reactor was opened and the content examined. A complete conversion into silicon nitride with an alpha to beta crystal ratio of 95 to 5 had taken place.

The experiment was repeated at a temperature of 1400° C. and a nitrogen pressure of 100 bar. After 5 hours the autoclave was opened and a complete conversion to silicon nitride with a alpha to beta ratio of 97 to 3 could be determined.

I claim:

1. A process for the production of silicon nitride by reaction of silicon dioxide, carbon and nitrogen under heat supply in an endothermic process at temperatures in the raw material mixture above 1300 degrees centigrade, comprising the steps of maintaining a nitrogen partial pressure above 5 bars during the reaction.

2. A process according to claim 1 wherein in a first step a part of the silicon dioxide is reacted to carbide with carbon in a mole ratio of 3 moles for each mole of reacted silicon dioxide and in a second step the nitrogen gas is supplied to nitridate the formed carbide and the remaining silicon dioxide.

3. A process according to claim 1, characterized in that the pressure is kept above 20 bars.

4. A process according to claim 1, characterized in that the temperature is kept below the fusion temperature for the silicon dioxide.

5. A process according to claim 4, characterized in that the temperature is kept below the threshold temperature for conversion of silicon nitride to silicon carbide at the pressure in question.

6. A process according to claim 5 wherein the temperature is above 90% of the threshold temperature, in degrees centigrades, at the selected nitrogen pressure.

7. A process according to claim 1, characterized in that the mole ratio of silicon dioxide to carbon in the reactor is kept between 1.9:1 to 10:1.

8. A process according to claim 7, characterized in that the mole ratio is kept between 1.95:1 to 2.2:1.

9. A process according to claim 1, characterized in that the reaction atmosphere, containing carbon monoxide, is mixed with air in such an amount and under such conditions that the carbon monoxide is oxidized into carbon dioxide, that the carbon dioxide is removed and that the remaining gas is used for further silicon nitride manufacture.

10. A process for the production of silicon nitride comprising reacting a mixture consisting of silicon dioxide and carbon at temperatures above 1407 degrees C. with nitrogen at a partial pressure above atmospheric pressure to yield a solid product consisting essentially of silicon nitride.

11. A process according to claim 10 wherein the temperature is kept below the threshold temperature for conversion of silicon nitride to silicon carbide at the pressure in question.

* * * * *